United States Patent
Husa et al.

(10) Patent No.: US 8,271,611 B2
(45) Date of Patent: Sep. 18, 2012

(54) METHOD AND SYSTEM OF INVOKING MIDLETS FROM A WEB BROWSER ON A LOCAL DEVICE

(75) Inventors: Knut Eilif Husa, Sande (NO); Geir Melby, Heggedal (NO)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1732 days.

(21) Appl. No.: 11/380,355

(22) Filed: Apr. 26, 2006

(65) Prior Publication Data
US 2007/0073835 A1   Mar. 29, 2007

Related U.S. Application Data

(60) Provisional application No. 60/721,323, filed on Sep. 28, 2005.

(51) Int. Cl.
G06F 15/16 (2006.01)
(52) U.S. Cl. .................................................. 709/219
(58) Field of Classification Search ................. 709/219
See application file for complete search history.

(56) References Cited

U.S. PATENT DOCUMENTS

| | | |
|---|---|---|
| 291,022 A | 1/1884 | Beaupied |
| 644,680 A | 3/1900 | Ordway |
| 720,783 A | 2/1903 | Clough |
| 1,243,033 A | 10/1917 | Beatty |
| 2,064,411 A | 2/1936 | Brandstein |
| 2,080,108 A | 5/1937 | Brandstein |
| 2,266,270 A | 12/1941 | Roth |
| 2,564,448 A | 8/1951 | Ritscher |
| 3,556,338 A | 1/1971 | Wilkinson et al. |
| 3,595,428 A | 7/1971 | Mounts et al. |
| 3,642,165 A | 2/1972 | Von der Osten |
| 3,655,089 A | 4/1972 | Tower |
| 3,862,614 A | 1/1975 | Kovac |
| 3,901,405 A | 8/1975 | Norberg |
| 3,937,389 A | 2/1976 | Wind |
| 4,198,040 A | 4/1980 | Colasent |
| 4,391,386 A | 7/1983 | Moret |

(Continued)

FOREIGN PATENT DOCUMENTS

EP   1691536 A1 *  8/2006

(Continued)

OTHER PUBLICATIONS

JSR 118 Expert Group "Mobile Information Device Profile for J2ME Version 2.0—Chapter 3" [Retreived online on Dec. 19, 2008] Nov. 5, 2002. [Retreived from the Internet] <URL: https://cds.sun.com/is-bin/INTERSHOP.enfinity/WFS/CDS-CDS_JCP-Site/en_US/-/USD/ViewFilteredProducts-SimpleBundleDownload>.*

(Continued)

Primary Examiner — Joseph Avellino
Assistant Examiner — James Baron
(74) Attorney, Agent, or Firm — Roger S. Burleigh

(57) ABSTRACT

Method and system for invoking MIDlets from a mobile web browser using the push registry mechanism provided by the application management software (AMS) of a local device, such as the push registry socket or push registry SMS, the local device including a mobile terminal, mobile telephone, smart phone, personal digital assistant (PDA), handset and the like.

30 Claims, 6 Drawing Sheets

U.S. PATENT DOCUMENTS

| | | | |
|---|---|---|---|
| 4,467,939 A | 8/1984 | Warwick | |
| 4,538,741 A | 9/1985 | Jacobs | |
| 5,941,954 A * | 8/1999 | Kalajan | 709/239 |
| 6,240,442 B1 * | 5/2001 | Domenikos et al. | 709/203 |
| 6,356,934 B1 * | 3/2002 | Delph | 709/204 |
| 6,810,409 B1 * | 10/2004 | Fry et al. | 709/202 |
| 7,039,708 B1 * | 5/2006 | Knobl et al. | 709/227 |
| 7,079,839 B1 * | 7/2006 | Papineau | 455/418 |
| 2005/0003810 A1 * | 1/2005 | Chu et al. | 455/418 |
| 2005/0021801 A1 * | 1/2005 | Kim | 709/230 |
| 2005/0034110 A1 * | 2/2005 | Lee et al. | 717/141 |
| 2006/0085517 A1 * | 4/2006 | Kaurila | 709/217 |

FOREIGN PATENT DOCUMENTS

| | | |
|---|---|---|
| WO | WO 03/022702 | 3/2003 |

OTHER PUBLICATIONS

Fleischman, Eric. "Advanced Streaming Format (ASF) Specification" [retreived online on Dec. 19, 2008] Jan. 9, 1998. [Retreived from the Internet] >URL: http://tools.ietf.org/html/draft-fleischman-asf-00>.*

IANA. "Special-Use IPv4 Addresses." [retrieved online on Dec. 17, 2008] Sep. 2002. [Retreived from the Internet] <URL: http://www.isi.edu/in-notes/rfc3330.txt>.*

Giguere, Eric. "Understanding J2ME Application Models." {Retreived online on Dec. 17, 2008] Oct. 2002. [Retreived from the Internet] <URL: http://developers.sun.com/mobility/midp/articles/models/>.*

JSR 118 Expert Group "Mobile Information Device Profile for J2ME Version 2.0—Chapter 3" [Retreived online on Dec. 19, 2008] Nov. 5, 2002. [Retreived from the Internet] <URL: https://cds.sun.com/is-bin/INTERSHOP.enfinity/WFS/CDS-CDS_JCP-Site/en_US/-USD/ViewFilteredProducts-SimpleBundleDownload>.*

Muchow J: "Implementing Push Technology with J2ME and MIDP" Internet Citation; Jun. 24, 2003; pp. 1-30; XP002363516.

JSR 118 Expert Group: "Mobile Information Device Profile for J2ME, version 2.0" Internet Citation; Nov. 5, 2002; XP002363519.

* cited by examiner

METHOD AND SYSTEM OF INVOKING MIDLETS FROM A WEB BROWSER ON A LOCAL DEVICE

CROSS-REFERENCE TO RELATED APPLICATIONS

This application claims the benefit of U.S. Provisional Application No. 60/721,323, filed Sep. 28, 2005, the disclosure of which is incorporated herein by reference.

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND

The present invention relates to mobile communications devices, and in particular, to method and systems for invoking MIDlets from a mobile web browser using push registry mechanisms provided by the application management software (AMS) of a local device.

The present invention relates to mobile communications devices, and in particular, to method and systems for invoking MIDlets from a mobile web browser using push registry mechanisms provided by the application management software (AMS) of a local device.

Mobile Information Device Profile (MIDP) applications (referred to herein as MIDlets) are software components that car be downloaded and installed on devices that provide a Java 2 Mobile Edition (J2ME) runtime environment. Currently the MIDP 2.0 version is the newest version specified from Sun. MIDlets support a push registry for invocation of MIDlets based on external events such as short messaging service (SMS) receive, socket connection, etc. Currently, mobile phones from a variety of manufacturers support push registry SMS. Push refers to the ability to receive and act on information asynchronously, as information becomes available, instead of forcing the application to use synchronous polling techniques that increase resource use.

Web standards presently do not provide any mechanism for invoking MIDlets from mobile web browsers. The extended hypertext mark-up language (XHTML) and wireless mark-up language (WML) languages supported by mobile web browsers do not contain support for invoking local applications such as applets and activeX components. What is desired is a method and system for invoking MIDlets from a mobile web browser.

BRIEF SUMMARY OF THE INVENTION

The present invention is a method and system for invoking MIDlets from a mobile web browser using the push registry mechanism provided by the application management software (AMS) of a local device, such as the push registry socket or push registry SMS, the local device including a mobile terminal, mobile telephone, smart phone, personal digital assistant (PDA), handset and the like.

DETAILED DESCRIPTION

Figure 1:
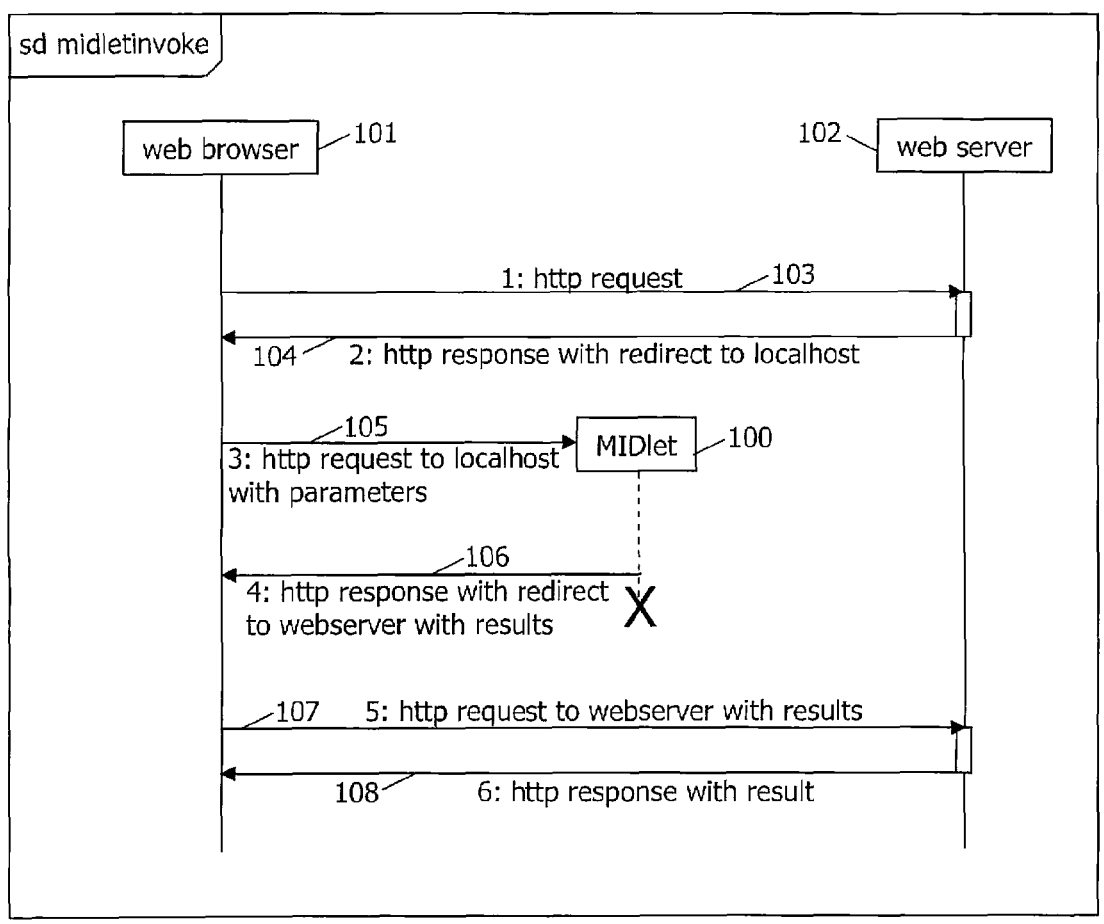
FIG. 1 is a sequence diagram illustrating a MIDlet invocation.

The present invention is a method and system for invoking MIDlets from a web browser on a local device, the local device including a mobile telephone, smart phone, PDA and the like, using the push registry mechanism provided by the AMS of the local device. Mobile device web browsers advantageously support XHTML and WML. However, these languages do not contain any language construct for invoking MIDlets residing on the local device. However, by performing an http request to a MIDlet on a local host, an application can be triggered. Referring now to FIG. 1, MIDlet 101 has registered for socket invocations in the push registry. The messages will now be described. In step 103, web browser 101 issues an http request to web server 102 requesting a service that needs interaction with a MIDlet 100 on the local device. In step 104, the http response contains a web page with a redirect to localhost. The redirect URL contains all the needed parameters for MIDlet 100. It is important that IP address 127.0.0.1 is used in the redirect URL since the terminal will try to resolve the domain name otherwise. This will fail since localhost will then be resolved in the WAP gateway and not in the web terminal. In step 105, the http request contains all the parameters needed for the MIDlet 100. The AMS triggers MIDlet 100. MIDlet 100 reads the contents buffered in the socket and decodes the http request. The web client is hanging while the MIDlet is performing its tasks. In step 106, MIDlet 100 completes it tasks and returns with an http response containing a redirect URL to the web server. In step 107, the http request contains the result parameters from the MIDlet. In step 108, the http response from the web server contains the result based on the MIDlet results.

Figure 2:
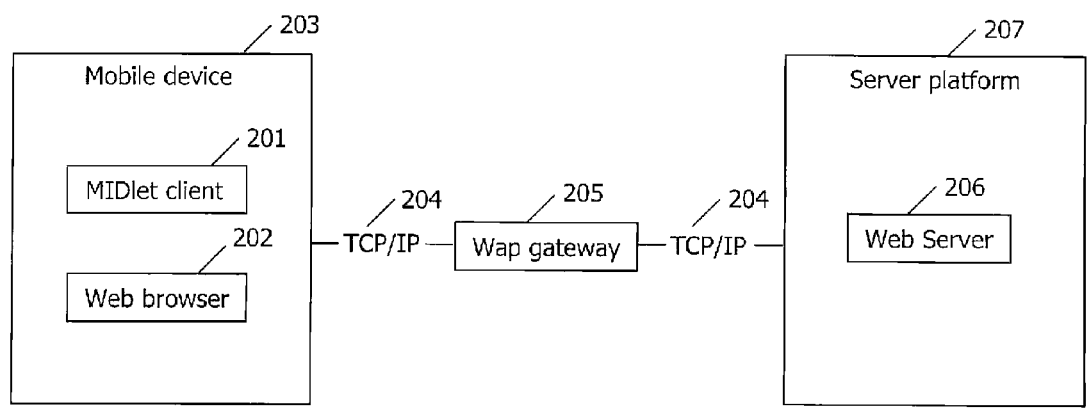
FIG. 2 is a deployment diagram of a system implementing the steps of FIG. 1.

FIG. 2 illustrates a deployment diagram of the system which is adapted to perform the steps of FIG. 1. Such a system includes MIDlet client 201 and web browser 202 in local device 203. Local device 203 is coupled via a TCP/IP connection 204 to WAP gateway 205 which in turn is coupled to web server 206 on server platform 207 via a TCP/IP connection 204. An example of utilizing the mechanism could be in bank transactions, i.e. in an authentication session.

Figure 3:
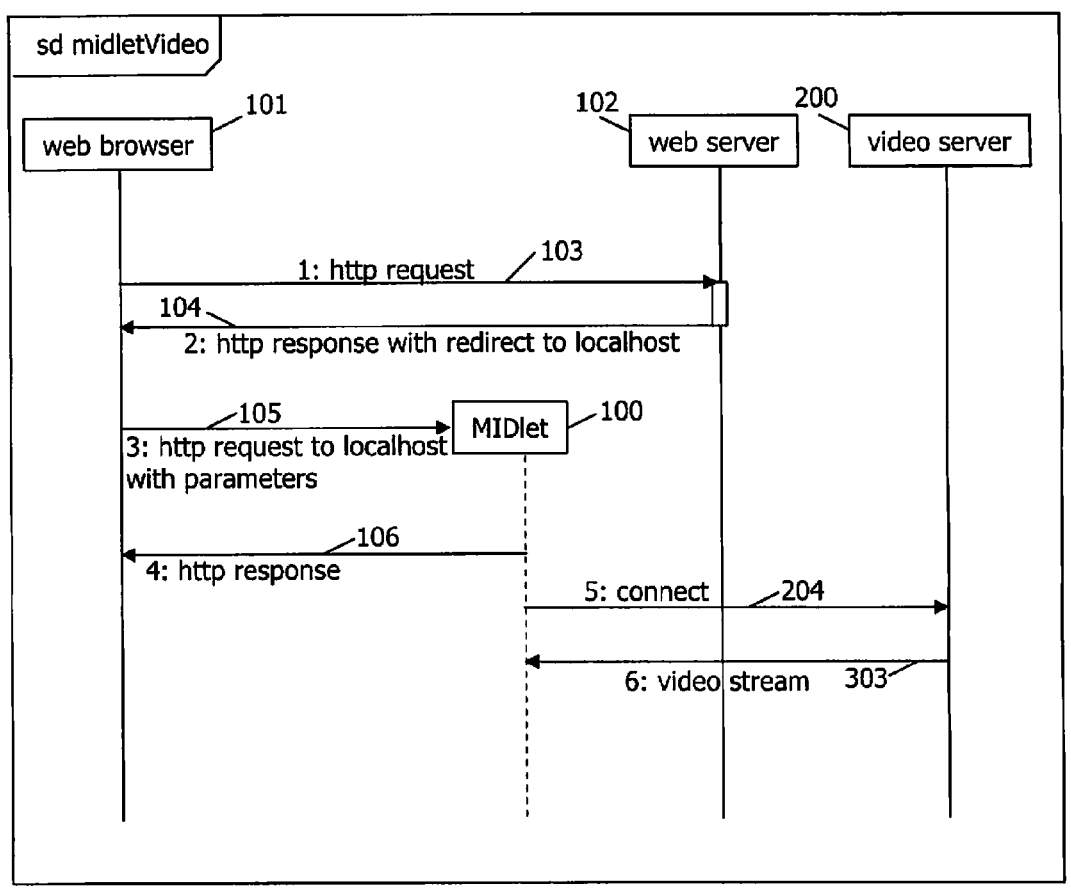
FIG. 3 illustrates the steps of a MIDlet connection to video.
Figure 4:
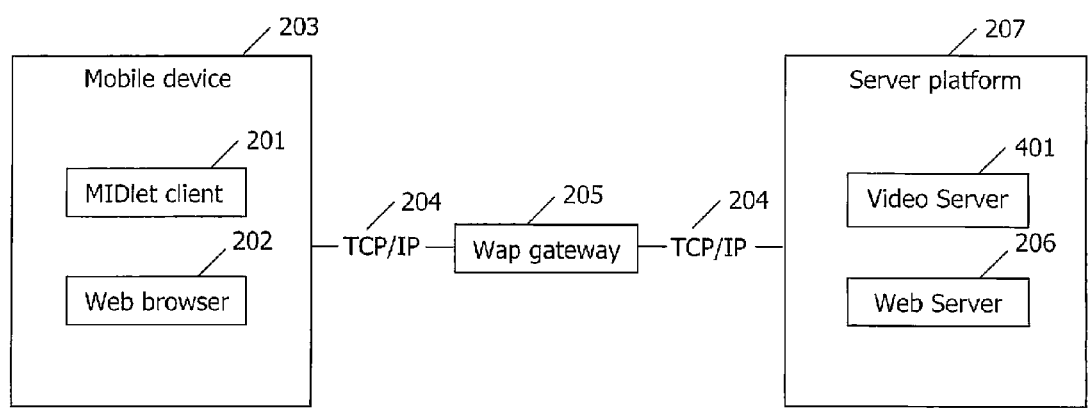
FIG. 4 is a deployment diagram of a system implementing the steps of FIG. 3.

The present invention can be further extended to provide invocation of the MIDlet without result return to web server. For example, an invocation of a video session could be initiated from a web page in steps 103, 104 and 105 of FIG. 1. Referring to FIG. 3, after http response in step 106, MIDlet 100 would then connect to video server 200 in step 204 and start video streaming in step 303. The address to video server 200 would then typically be parts of the parameters that are passed in the message of step 105. A deployment diagram of the system which is adapted to perform the steps of FIG. 3 is displayed in FIG. 4. As seen therein, the system is similar to that of FIG. 2, with the addition of video server 401 in server platform 207.

Figure 5:
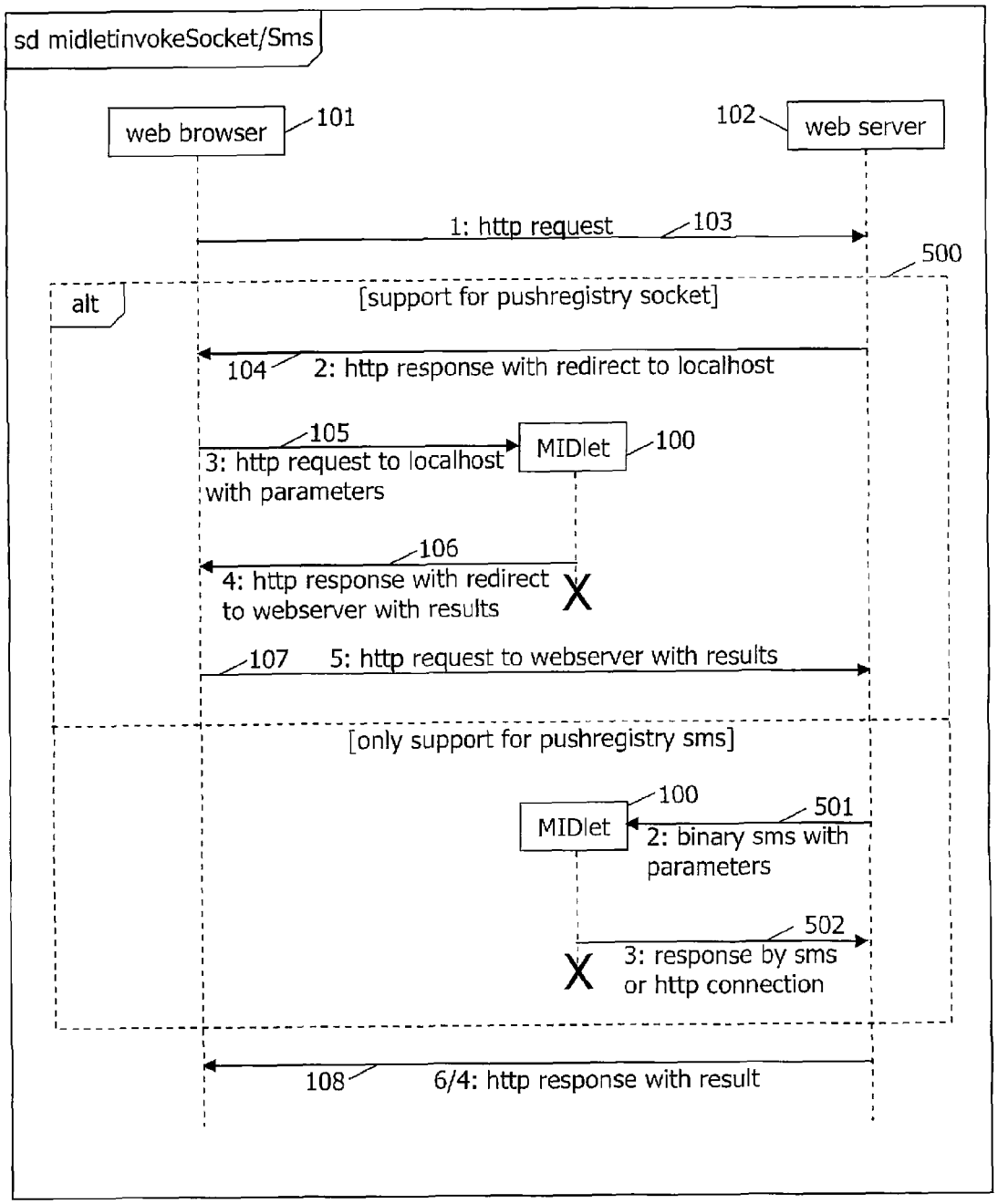
FIG. 5 illustrates the steps of an invocation based on supported push registry mechanisms.
Figure 6:
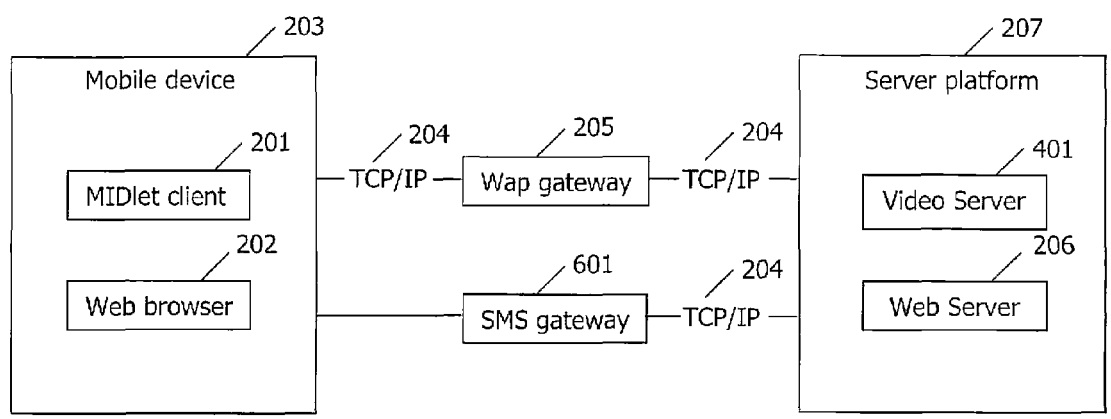
FIG. 6 is a deployment diagram for the system of FIG. 5.

A further aspect of the present invention is the invocation of a MIDlet based on supported push registry mechanisms. Many devices only support push registry SMS and, thus, the previously disclosed methods and systems which depend on the use of the push registry socket would not operate with the devices which only support push registry SMS. Thus a further extension of the present invention is provided. Referring to FIG. 5, in step 103, web browser 101 issues an http request to the web server requesting a service that needs interaction with a MIDlet 100 on the local device (not shown). Based on the user agent profile, the web server 102 determines whether the local device supports push registry socket or push registry SMS in the alternative fragment 500. If push registry socket is supported, the steps describes the first operand of the alt fragment chosen. This is the same as described in FIGS. 1 and 3. If only push registry SMS is supported then the steps of the second operand of 500 is chosen. In step 501, web server 102 then submits a binary SMS that might contain parameters and by this invokes the MIDlet. In step 502, MIDlet 100 completes it tasks and returns with an SMS or http request that might contain the results from the task performed by the MIDlet. In step 108, the Web server now returns the http response to the web browser. As far as the user is concerned, it is transparent whether the steps of FIG. 1 or FIG. 5 are performed. FIG. 6 provides a deployment diagram for the system which is adapted to implement the steps of FIG. 5. As seen therein, local device 203 is coupled to SMS gateway 601 via TCP/IP 204 which is coupled to server platform 207 via TCP/IP 204.

The mechanisms provided by the present invention advantageously make it possible to invoke a MIDlet from a web browser on a local device. A further extension of the present invention is adapted to permit the MIDlet to be invoked using binary SMS.

Although several embodiments of the invention have been described above in detail, this does not limit the scope of the invention, which can be practiced in a variety of embodiments.

What is claimed is:

1. A method for invoking MIDlets from a web browser on a local device, comprising:
    performing an http request to a MIDlet on a local host using a push registry mechanism provided by the application management software (AMS) of the local device;
    triggering, by the AMS, the MIDlet,
    registering the MIDlet socket invocations in the push registry;
    issuing by a web browser an http request to a web server;
    requesting, via the http request, a service that requires interaction with the MIDlet on the local device;
    containing in an http response a web page with a redirect URL to local host; and,
    containing in the redirect URL all the needed parameters for the MIDlet.

2. The method of claim 1, further comprising:
    reading, by the MIDlet, contents buffered in the socket; and
    decoding the http request.

3. The method of claim 2, further comprising upon completing, by the MIDlet, its tasks, returning with an http response containing a redirect URL to the web server.

4. The method of claim 3, wherein http request contains the result parameters from the MIDlet.

5. The method of claim 4, wherein the http response from the web server contains the result based on the MIDlet results.

6. The method of claim 1, further comprising determining, by the web server based on a user agent profile, whether the local device supports push registry socket or push registry SMS.

7. A method for invoking a video session from a web page using a MIDlet from a web browser on a local device without a result return to a web server, comprising:
    performing an http request to a MIDlet on a local host using a push registry mechanism provided by the application management software (AMS) of the local device;
    triggering by the AMS, the MIDlet;
    registering the MIDlet socket invocations in the push registry;
    issuing by a web browser an http request to a web server;
    requesting, via the http request to the web server, a service that requires interaction with the MIDlet on the local device;
    decoding the http request;
    returning, upon completion of its tasks by the MIDlet, with an http response containing a redirect URL to the web server, the redirect URL containing all the needed parameters for the MIDlet, wherein the http response from the web server contains the result based on the MIDlet results;
    connecting to a video server; wherein the address to the video server are parts of the parameters passed to the MIDlet; and,
    commencing video streaming to the local device.

8. The method of claim 7, further comprising determining, by the web server, based on a user agent profile whether the local device supports push registry socket or push registry SMS.

9. A system for invoking MIDlets from a web browser on a local device, comprising:
    a MIDlet client;
    a web browser for use in a local device;
    a web server located on a server platform;
    a WAP gateway, the local device being coupled via a TCP/IP connection to the WAP gateway, the WAP gateway being coupled to the web server on the server platform via a TCP/IP connection, wherein the web browser for use on a local device includes:
    a means for performing an http request to a MIDlet on the web server using a push registry mechanism provided by an application management software (AMS) of the local device and a means for triggering by the AMS, the MIDlet;
    a means for requesting, via the http request, a service that requires interaction with the MIDlet client on the local device;
    a means for containing in the http response a web page with a redirect URL to local device; and
    a means for containing in the redirect URL all the needed parameters for the MIDlet.

10. The system of claim 9, wherein the local device is one selected from the group consisting of a mobile terminal, mobile telephone, a smart phone, a personal digital assistant (PDA) and a handset.

11. The system of claim 9, for use in an authentication session.

12. The system of claim 9, further comprising a video server on the server platform.

13. The system of claim 9, further comprising an SMS gateway, the local device being coupled to the SMS gateway via TCP/IP interface which is coupled to the server platform via the TCP/IP interface.

14. A local device having a web browser adapted to invoke MIDlets, comprising:
- a means for performing an http request to a MIDlet on a local host using a push registry mechanism provided by an application management software (AMS) of the local device;
- a means for triggering, by the AMS, the MIDlet;
- a means for registering the MIDlet socket invocations in a push registry;
- a means for issuing, by the web browser, an http request to a web server;
- a means for requesting, via the http request, a service that requires interaction with the MIDlet on the local device; and
- a means for containing in the http response a web page with a redirect URL to the local host; and
- a means for containing in the redirect URL all the needed parameters for the MIDlet.

15. The local device of claim 14, further comprising means for using, by the redirect URL, IP address 127.0.0.1.

16. The local device of claim 14, further comprising:
- means for reading, by the MIDlet, the contents buffered in the socket; and
- means for decoding the http request.

17. The local device of claim 16, further comprising means for returning with an http response containing a redirect URL to the web server upon completion of the MIDlet tasks.

18. The local device of claim 17, wherein the http request contains the result parameters from the MIDlet.

19. The local device of claim 18, wherein the http response from the web server contains the result based on the MIDlet results.

20. The local device of claim 14, further comprising means for determining, by the web server based on a user agent profile, whether the local device supports push registry socket or push registry SMS.

21. A local device having a web browser adapted to invoke a video session from a web page using a MIDlet without a result return to a web server, comprising:
- means for performing an http request to a MIDlet on a local host using a push registry mechanism provided by an application management software (AMS) of the local device;
- means for triggering, by the AMS, the MIDlet;
- means for registering the MIDlet socket invocations in the push registry;
- means for issuing by a web browser an http request to a web server;
- means for requesting, via the http request to the web server, a service that requires interaction with the MIDlet on the local device;
- means for connecting to a video server;
- means for commencing video streaming to the local device; and
- means for containing in the redirect URL all the needed parameters for the MIDlet, wherein the address to the video server are parts of the parameters passed to the MIDlet.

22. The local device of claim 21, further comprising using, by the redirect URL, IP address 127.0.0.1.

23. The local device of claim 21, wherein the AMS triggers the MIDlet.

24. The local device of claim 23, further comprising means for reading, by the MIDlet, the contents buffered in the socket; and decoding the http request.

25. The local device of claim 24, further comprising means for returning, upon completion of its tasks by the MIDlet, with an http response containing a redirect URL to the web server.

26. The local device of claim 25, wherein http request contains the result parameters from the MIDlet.

27. The local device of claim 26, wherein the http response from the web server contains the result based on the MIDlet results.

28. The local device of claim 21, further comprising means for determining, by the web server, based on a user agent profile whether the local device supports push registry socket or push registry SMS.

29. The method of claim 1, further comprising using, by the redirect URL, IP address 127.0.0.1.

30. The method of claim 7, further comprising using, by the redirect URL, IP address 127.0.0.1.

* * * * *